(12) United States Patent
Almasan et al.

(10) Patent No.: US 12,481,979 B2
(45) Date of Patent: Nov. 25, 2025

(54) HYPER-PERSONALIZED IDENTITY-BASED FINANCIAL SYSTEM

(71) Applicant: American Express Travel Related Services Company, Inc., New York, NY (US)

(72) Inventors: Rares Ioan Almasan, Phoenix, AZ (US); Rebecca L. Henry, Phonix, AZ (US); Swatee Singh, Scottsdale, AZ (US); Kenneth M. Wolf, Perrineville, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/397,331

(22) Filed: Dec. 27, 2023

(65) Prior Publication Data
US 2024/0127224 A1 Apr. 18, 2024

Related U.S. Application Data

(63) Continuation of application No. 16/418,430, filed on May 21, 2019, now abandoned.

(51) Int. Cl.
*G06Q 20/36* (2012.01)
*G06N 20/00* (2019.01)
(Continued)

(52) U.S. Cl.
CPC ......... *G06Q 20/3672* (2013.01); *G06N 20/00* (2019.01); *G06Q 20/4014* (2013.01);
(Continued)

(58) Field of Classification Search
None
See application file for complete search history.

(56) References Cited

U.S. PATENT DOCUMENTS

| 10,187,368 B2 * | 1/2019 | Way | G06Q 40/04 |
| 11,269,859 B1 * | 3/2022 | Luedtke | G06F 16/245 |

(Continued)

OTHER PUBLICATIONS

A. Povilionis et al., "Identity Management, Access Control and Privacy in Integrated Care Platforms: The Picaso Project," 2018 International Carnahan Conference on Security Technology (ICCST), Montreal, QC, Canada, 2018, pp. 1-5, doi: 10.1109/CCST.2018.8585716. (Year: 2018).*

*Primary Examiner* — Eduardo Castilho
(74) *Attorney, Agent, or Firm* — Thomas Horstemeyer, LLP

(57) ABSTRACT

Systems and methods for identity-based interconnected transactions are disclosed. The system may receive an interconnected transaction request comprising a first financial subsystem identifier, a second financial subsystem identifier, and a transaction request. The first financial subsystem and the second financial subsystem may not be in direct communication with each other. The first financial subsystem may write the interconnected transaction request to an interconnected transaction ledger. The second financial subsystem may retrieve the interconnected transaction request from the interconnected transaction ledger. In response to retrieving the interconnected transaction request the second financial subsystem may complete the transaction request.

20 Claims, 6 Drawing Sheets

(51) Int. Cl.
  *G06Q 20/40* (2012.01)
  *G06Q 20/42* (2012.01)
  *H04L 9/06* (2006.01)

(52) U.S. Cl.
  CPC ......... *G06Q 20/425* (2013.01); *H04L 9/0637* (2013.01); *G06Q 2220/00* (2013.01)

(56) References Cited

U.S. PATENT DOCUMENTS

| | | | |
|---|---|---|---|
| 12,086,110 B1* | 9/2024 | Desai | G06Q 40/08 |
| 2013/0024371 A1* | 1/2013 | Hariramani | G06Q 20/384 |
| | | | 705/41 |
| 2014/0074568 A1* | 3/2014 | Moscoe | G06Q 20/40 |
| | | | 705/14.3 |
| 2016/0342989 A1* | 11/2016 | Davis | H04L 9/50 |
| 2017/0132626 A1* | 5/2017 | Kennedy | G06Q 20/065 |
| 2017/0161734 A1* | 6/2017 | Bankston | G06Q 20/3829 |
| 2017/0243212 A1* | 8/2017 | Castinado | G06Q 20/389 |
| 2018/0189781 A1* | 7/2018 | McCann | G06Q 20/202 |
| 2018/0204195 A1* | 7/2018 | Kang | G06Q 20/36 |
| 2018/0247320 A1* | 8/2018 | Gauld | G06Q 30/0201 |
| 2018/0268401 A1* | 9/2018 | Ortiz | G06Q 20/326 |
| 2019/0253422 A1* | 8/2019 | Treat | G06Q 20/223 |
| 2019/0311392 A1* | 10/2019 | Swamidurai | H04L 63/123 |
| 2020/0076610 A1* | 3/2020 | Wang | H04L 9/0637 |
| 2020/0226280 A1* | 7/2020 | Somani | G06Q 20/387 |
| 2021/0264459 A1* | 8/2021 | Chen | G06Q 30/02 |
| 2021/0326992 A1* | 10/2021 | Leise | G06Q 40/08 |

* cited by examiner

HYPER-PERSONALIZED IDENTITY-BASED FINANCIAL SYSTEM

CROSS-REFERENCE TO RELATED APPLICATION

This application is a continuation of, and claims priority to and the benefit of, co-pending U.S. patent application Ser. No. 16/418,430, entitled "HYPER-PERSONALIZED IDENTITY-BASED FINANCIAL SYSTEM" and filed on May 21, 2019, which is herein incorporated by reference in their entireties.

FIELD

The disclosure generally relates to financial systems and processes, and more specifically, to a hyper-personalized identity-based financial system.

BACKGROUND

Users may interact with financial institutions in a variety of capacities. For example, a user may interact with the financial institution as a transaction account holder (e.g. a consumer-based transaction account, a corporate-based transaction account, etc.), an employee of the financial institution, a merchant registered with the financial institution, a supplier registered with the financial institution, and/or in other capacities. The financial institution typically comprises separate and distinct systems and databases for each type of interactive capacity (e.g., separate and distinct transaction account holder systems, employee systems, merchant systems, supplier systems, etc.).

A technical problem is that the user may not be universally recognized across different interactive capacities with the financial institution. As a result, a user that interacts with the financial institution in a plurality of capacities may be unable to cross-interact between the collective separate and distinct systems.

SUMMARY

Systems, methods, and articles of manufacture (collectively, the "system") for identity-based interconnected transactions are disclosed. The system may receive an interconnected transaction request comprising a first financial subsystem identifier, a second financial subsystem identifier, and a transaction request. The first financial subsystem and the second financial subsystem may not be in direct communication with each other. The first financial subsystem of the system may write the interconnected transaction request to an interconnected transaction ledger. The second financial subsystem of the system may retrieve the interconnected transaction request from the interconnected transaction ledger. In response to retrieving the interconnected transaction request the second financial subsystem may complete the transaction request from the interconnected transaction request.

In various embodiments, the transaction request may comprise a first system transaction request and a second system transaction request, and wherein in response to the receiving the interconnected transaction request the first financial subsystem performs the first system transaction request. In response to retrieving the interconnected transaction request the second financial subsystem may perform the second system transaction request. The interconnected transaction request may be transmitted by a first user. The first system transaction request may be associated with a first account of the first user, and the second system transaction request may define a second account associated with a second user.

In various embodiments, the interconnected transaction ledger may comprise a blockchain-based technology. The first financial subsystem may comprise a blockchain node, and wherein the first financial subsystem writes the interconnected transaction request to the interconnected transaction ledger via the blockchain node. The first financial subsystem may communicate with a ledger communicator to write the interconnected transaction request to the interconnected transaction ledger.

In various embodiments, a knowledge system may be configured to monitor the writing the interconnected transaction request to the interconnected transaction ledger and the retrieving the interconnected transaction request from the interconnected transaction ledger. The knowledge system may generate an identity-based recommendation based on the monitoring. The knowledge system may generate the identity-based recommendation using a machine learning model. The identity-based recommendation may comprise at least one of a financial system recommendation or a user recommendation.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
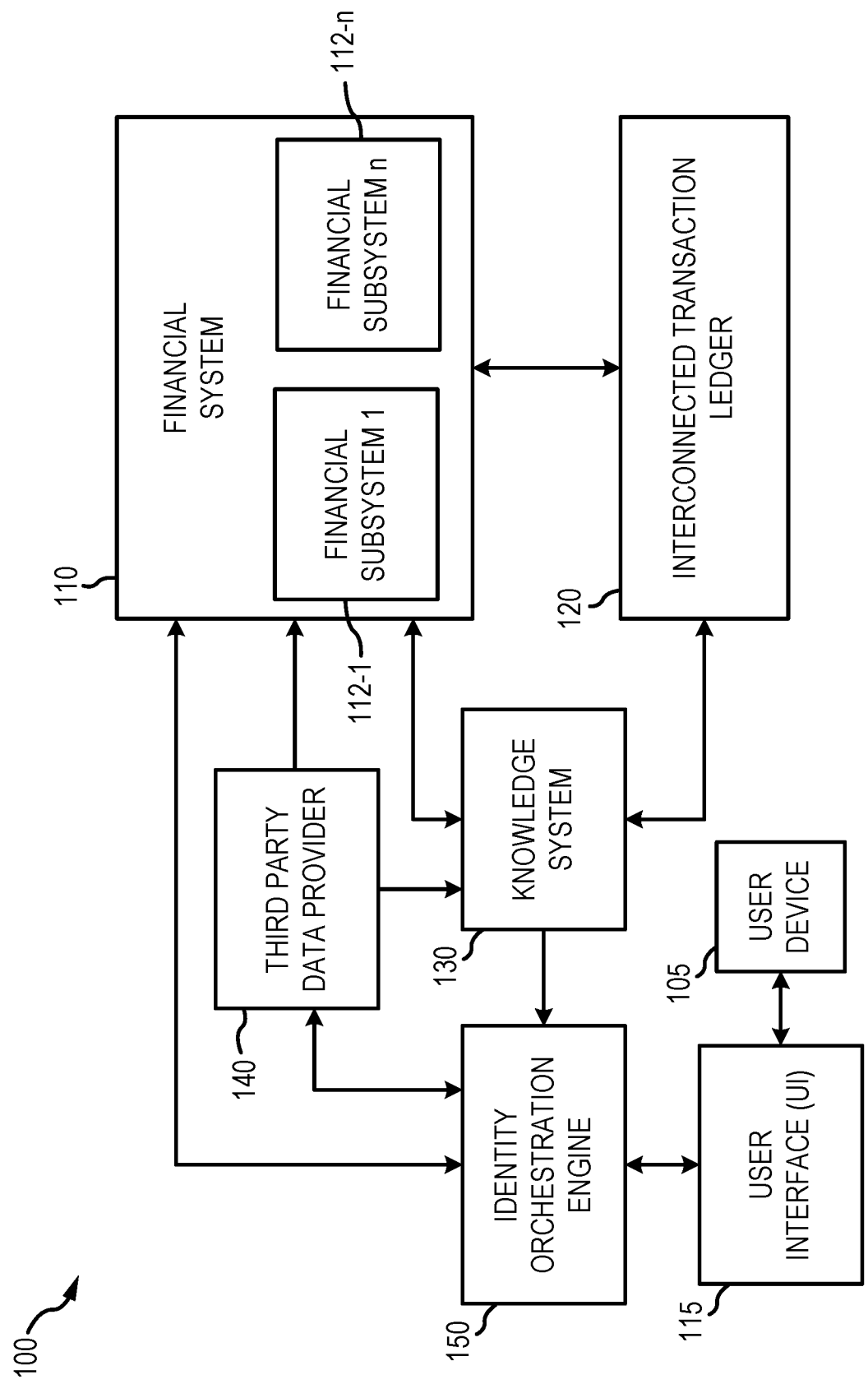
FIG. 1 is a block diagram illustrating various system components of an identity-based interconnected financial system, in accordance with various embodiments.

In various embodiments, systems and methods for identity-based interconnected financial systems are disclosed. The system may enable users to interact with a financial system from a plurality interactive capacities. For example, the financial system may provide services for users in a variety of interactive capacities. The user may interact with the financial system as a transaction account holder (e.g. a consumer-based transaction account, a corporate-based transaction account, etc.), an employee of the financial institution, a merchant registered with the financial institution, a supplier registered with the financial institution, and/or in other capacities. For example, a first user may have a consumer-based transaction account with a financial system and may also be a merchant registered with the financial system. As a further example, a second user may have a corporate-based transaction account with a financial system and may also be an employee at the financial system.

The financial system may comprise distinct and separate subsystems for each interactive capacity. For example, the financial system may comprise subsystems for transaction account holder systems, employee systems, merchant systems, supplier systems, and/or the like. In various embodiments, the system may allow a user to interact across different financial subsystems that the user has an interactive capacity with. In that regard, the system may provide a technical solution to the technical problem caused by separate and distinct subsystems typically found in financial systems and institutions. Therefore, the system provides a technical solution to the technical problem caused by typical financial systems that do not universally recognize the user across different interactive capacities with the financial institution.

The user may transmit an interconnected transaction request to interact with a plurality of financial subsystems. For example, a first user having a consumer-based transaction account and registered as a merchant with the financial institution may desire to use loyalty points earned from the consumer-based transaction account to at least partially pay for a merchant payable account. As discussed further herein, the system may enable communications between the two financial subsystems to transmit the specified loyalty points to the merchant payable account.

In various embodiments, the system further improves the functioning of the computer-based system. The system may improve the functioning of a financial system collectively (e.g., the financial system) and individually (e.g., each financial subsystem). For example, by enabling communications between typically separate and distinct subsystems and enabling a user to be universally recognized across the separate and distinct subsystems, the system may decrease the need for users to interact separately with different financial subsystems. The user may therefore perform less computer functions and provide less input, which saves on data storage and memory which speeds processing.

In various embodiments, by providing interconnected transactions the system may also reduce transaction clearing time. For example, by making data from interconnected transaction available to each distinct and separate financial subsystem, each distinct and separate financial subsystem may operate and process the data faster than in typical financial systems. In various embodiments, the system may also reduce transactional errors of money, funds, rewards, points, etc. transferred between accounts of the same user. Reducing transactional errors may also decrease the processing, data storage, and memory needed to resolve the transactional errors, and impacts from the transactional errors.

In various embodiments, and with reference to FIG. 1, an identity-based interconnected financial system 100 is disclosed (e.g., "system 100"). System 100 may comprise one or more user devices 105, user interfaces (UI) 115, financial systems 110, interconnected transaction ledgers 120, knowledge systems 130, third party data providers 140, and/or identity orchestration engines 150. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, a user may access user device 105 to interact with identity orchestration engine 150, initiate and complete interconnected transactions, and/or the like, as discussed further herein. User device 105 may be in electronic communication with user interface (UI) 115. User device 105 may comprise any suitable hardware, software, and/or database components capable of sending, receiving, and storing data. For example, user device 105 may comprise a personal computer, personal digital assistant, cellular phone, smartphone (e.g., IPHONE®, BLACKBERRY®, etc.), Internet of Things (IoT) device, and/or the like. User device 105 may comprise an operating system such as, for example, a WINDOWS® mobile operating system, an ANDROID® operating system, APPLE® IOS®, a BLACKBERRY® operating system, a LINUX® operating system, and the like. User device 105 may also comprise software components installed on user device 105 and configured to allow user device 105 access to various systems, services, and components in system 100. For example, user device 105 may comprise a web browser (e.g., MICROSOFT INTERNET EXPLORER®, GOOGLE CHROME®, etc.), an application, a micro-app or mobile application, or the like configured to allow user device 105 to access UI 115.

In various embodiments, UI 115 may be configured to provide an interface (e.g., a graphical user interface) for a user to interact with to review data from financial system 110, transmit interconnected transaction requests, and/or the like, as discussed further herein. UI 115 may be in electronic communication with user device 105, financial system 110, and/or knowledge system 130. UI 115 may include software modules, logic engines, various databases, and/or the like, configured to enable user access to financial system 110. For example, UI 115 may be configured to provide a web-based interface for a user to access and view data provided by financial system 110, transmit interconnected transaction requests, and/or the like. UI 115 may also be configured to display one or more prompts to the user for completing interconnected transaction requests, as discussed further herein.

In various embodiments, financial system 110 may be in electronic communication with identity orchestration engine 150, interconnected transaction ledger 120, knowledge system 130, and/or third party data provider 140. Phrases and terms similar to "financial system," "issuer system," "transaction account issuer," "financial institution," "payment network," or the like may include any entity that offers transaction account services. Although often referred to as a "financial institution," financial system 110 may represent any type of bank, lender, or other type of account issuing institution, such as transaction account companies, card sponsoring companies, or third-party issuers under contract with financial system 110. Financial system 110 may comprise a sub-network, computer-based system, software component, and/or the like configured to provide an access point to various systems, engines, servers, and components for a given transaction account issuer.

Financial system 110 may comprise one or more hardware, software, and/or database components. For example, financial system 110 may comprise one or more network environments, servers, computer-based systems, processors, databases, and/or the like. Financial system 110 may comprise at least one computing device in the form of a computer or processor, or a set of computers/processors, although other types of computing units or systems may be used such as, for example, a server, web server, pooled servers, or the like. Financial system 110 may also include software, such as services, APIs, and the like, configured to perform various operations discussed herein. In various embodiments, financial system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. In various embodiments, financial system 110 may also comprise a transaction account issuer's Credit Authorization System ("CAS") capable of authorizing transactions, as discussed further herein.

Financial system 110 may include subsystems, databases, and the like related to various financial systems and processes. For example, financial system 110 may comprise a first financial subsystem 112-1, an Nth financial subsystem 112-*n*, and/or any other suitable number of subsystems (collectively, financial subsystems 112). Financial subsystems 112 may comprise transaction account holder systems, employee systems, merchant systems, supplier systems, and/or the like. Each financial subsystem 112 may comprise one or more subsystem components, such as, for example, one or more authorization engines, authentication engines and databases, settlement engines and databases, accounts receivable systems and databases, accounts payable systems and databases, account subscriber systems and databases, and/or the like.

Figure 2:
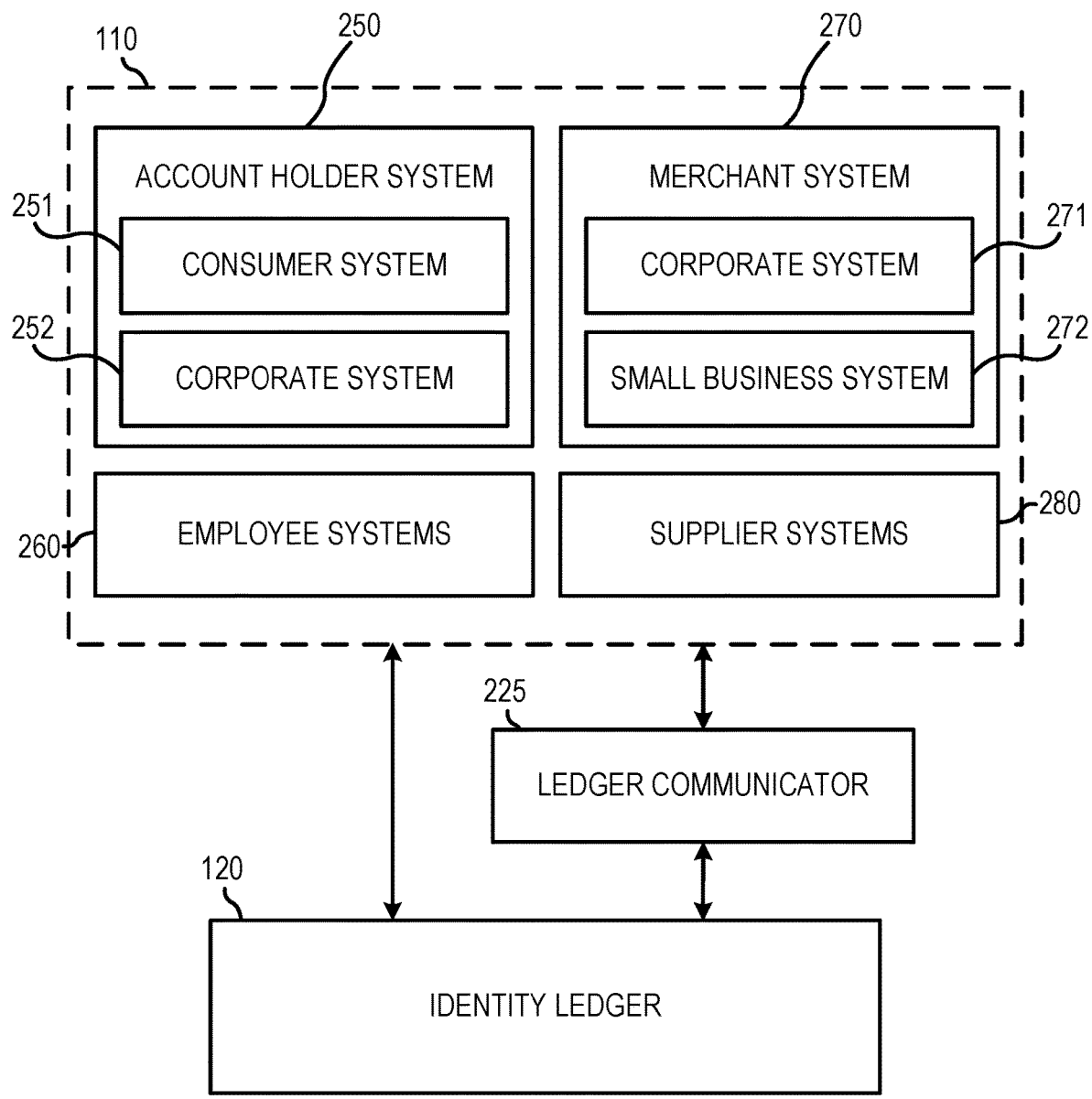
FIG. 2 is a block diagram illustrating various components of an exemplary financial system for an identity-based interconnected financial system, in accordance with various embodiments.

In various embodiments, each financial subsystem 112 may comprise any suitable and/or desired subsystem of financial system 110. For example, and with reference to FIG. 2, various exemplary financial subsystems may include an account holder system 250, an employee systems 260, a merchant system 270, a supplier systems 280.

Figure 3A:
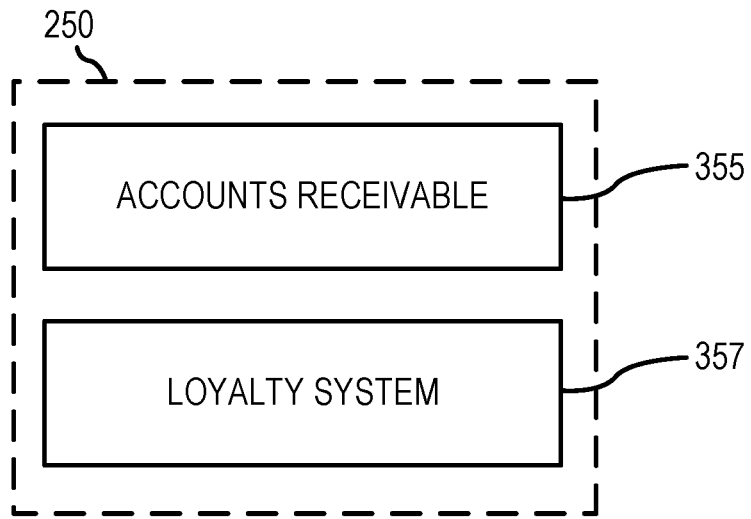
FIGS. 3A-3D are block diagrams illustrating various components of exemplary financial subsystems for an identity-based interconnected financial system, in accordance with various embodiments.

Account holder system 250 may comprise various subsystems, databases, or the like associated with transaction accounts, such as, for example, a consumer system 251, a corporate system 252, and/or the like. Consumer system 251 may comprise hardware, software, and/or database components for consumer transaction accounts (e.g., consumer savings accounts, consumer checking accounts, consumer credit cards, etc.). Corporate system 252 may comprise hardware, software, and/or database components for corporate transaction accounts (e.g., corporate savings accounts, corporate checking accounts, corporate credit cards, etc.). In various embodiments, and with reference to FIG. 3A, an exemplary account holder system 250 (e.g., consumer system 251, corporate system 252, etc.) may comprise an accounts receivable system 355, a loyalty system 257, and/or the like. Accounts receivable system 355 may comprise various accounts receivable systems, databases, and/or the like associated with consumer and/or corporate transaction accounts (e.g., consumer system 251, corporate system 252, etc.). Loyalty system 257 may comprise any suitable system capable of offering a transaction-based reward (e.g., points, cryptocurrency, cashback, account credit, etc.) or similar rewards to transaction account users (including consumer or corporate transaction accounts).

Figure 3B:
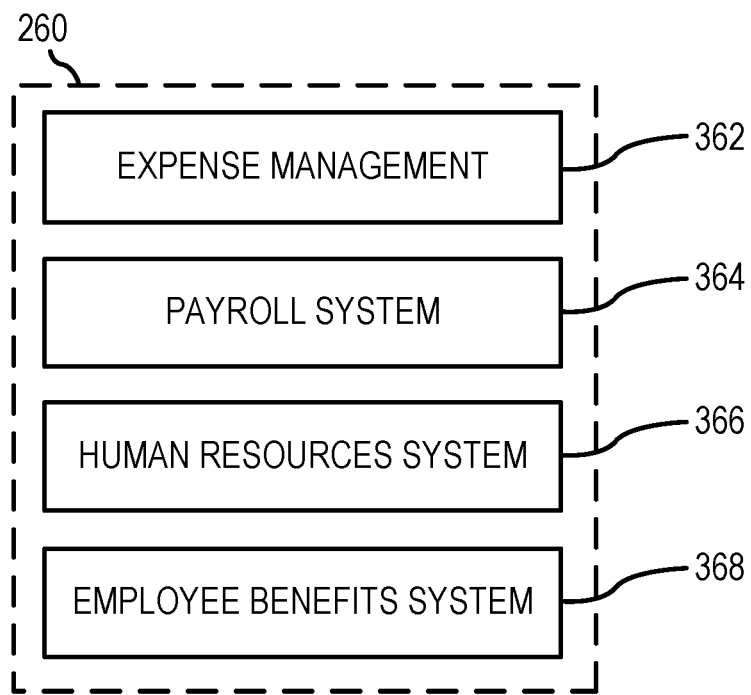

With reference again to FIG. 2, employee system 260 may comprise various subsystems, databases, or the like associated with financial system employees. Employee system 260 may comprise hardware, software, and/or database components comprise employee data. For example, in accordance with various embodiments and with reference to FIG. 3B, an exemplary employee system 260 may comprise an expense management system 362, a payroll system 364, a human resources system 366, and/or an employee benefits system 368. Expense management system 362 may comprise hardware, software, and/or database components related to employee expense data, such as, for example, expenses, reimbursements, and/or the like. Payroll system 364 may comprise hardware, software, and/or database components related to employee payroll data, such as, for example employee salaries, employee gross payment data, employee net payment data, employee taxes, employee direct deposit accounts, and/or the like. Human resources system 366 may comprise hardware, software, and/or database components related to employee data, such as, for example, employment data, employee contact information, and/or the like. Employee benefits system 368 may comprise hardware, software, and/or database components related to employee benefits data, such as, for example, benefits offered to employees such as employee reward points, employee offers, and/or the like.

Figure 3C:
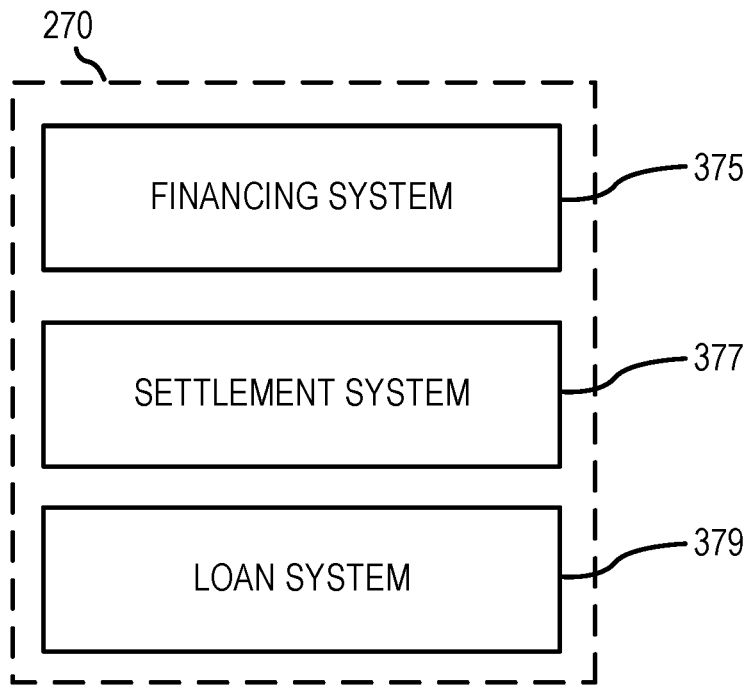

Merchant system 270 may comprise various subsystems, databases, or the like associated with merchants, such as, for example, a corporate system 271, a small business system 272, and/or the like. Corporate system 271 may comprise hardware, software, and/or database components for corporate merchants. Small business system 272 may comprise hardware, software, and/or database components for small business merchants. In various embodiments, and with reference to FIG. 3C, an exemplary merchant system 270 may comprise a financing system 375, a settlement system 377, and/or a loan system 379. Financing system 375 may comprise hardware, software, and/or database components related to merchant financing data, such as, for example, merchant financing account data, merchant financing balances, and/or the like. Settlement system 377 may comprise hardware, software, and/or database components related to merchant transaction data, such as, for example, merchant accounts payable, settled transactions, and/or the like. Loan system 379 may comprise hardware, software, and/or database components related to merchant loans, such as, for example, merchant loan account data, outstanding loan balances, and/or the like.

Figure 3D:
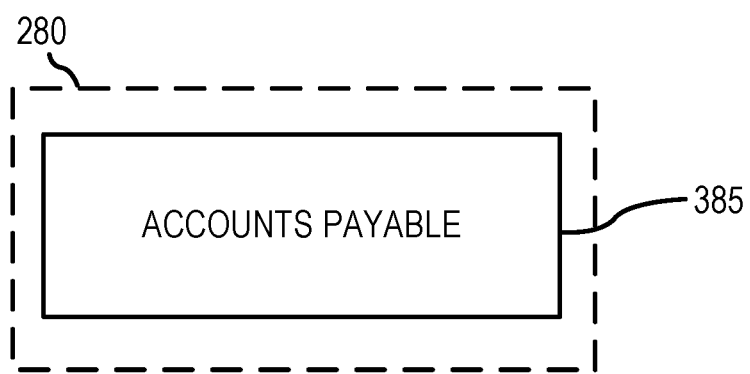

With reference again to FIG. 2, supplier systems 280 may comprise various subsystems, databases, or the like associated with suppliers associated with the financial system. Supplier systems 280 may comprise hardware, software, and/or database components comprising supplier data. For example, in accordance with various embodiments and with reference to FIG. 3D, an exemplary supplier systems 280 may comprise an accounts payable system 385 and/or the like. Accounts payable system 385 may comprise hardware, software, and/or database components related to supplier accounts payable, such as an accounts payable balance, and/or the like.

In various embodiments, and with reference again to FIG. 1, identity orchestration engine 150 may be in electronic communication with UI 115, financial system 110, knowledge system 130, and/or third party data provider 140. In various embodiments, identity orchestration engine 150 may comprise a subcomponent of financial system 110. Identity orchestration engine 150 may comprise one or more hardware, software, and/or database components. For example, identity orchestration engine 150 may comprise one or more network environments, servers, computer-based systems, processors, databases, and/or the like. Identity orchestration engine 150 may comprise at least one computing device in the form of a computer or processor, or a set of computers/processors, although other types of computing units or systems may be used such as, for example, a server, web server, pooled servers, or the like. Identity orchestration engine 150 may also include software, such as services, APIs, and the like, configured to perform various operations discussed herein. In various embodiments, identity orchestration engine 150 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, identity orchestration engine 150 may be configured to provide a user, via user device 105 and/or via UI 115, hyper-personalization to identity-based data across various systems of system 100. For example, identity orchestration engine 150 may be configured to provide a user access to financial system 110, data knowledge system 130, third party data provider 140, and/or any other suitable or desired system of system 100. In that respect, identity orchestration engine 150 may enable the user to access data associated with the user (e.g., based on the user's identity) at each of financial system 110, data knowledge system 130, and/or third party data provider 140. For example, the user may interface with identity orchestration engine 150 to interact with interconnected transactions at financial system 110. As a further example, the user may interface with identity orchestration engine 150 to interact with identity-based recommendations at knowledge system 130. As a further example, the user may interface with identity orchestration engine 150 to interact with third party data associated with the user at third party data provider 140. In that respect, identity orchestration engine 150 may provide a hyper-personalized identity manager wherein the user may interconnect with various identity-based data in system 100.

In various embodiments, interconnected transaction ledger 120 may be in electronic communication with financial system 110 and/or knowledge system 130. Interconnected transaction ledger 120 may be configured to record transactions between financial subsystems 112 to create a ledger of interconnected transactions between financial subsystems 112 and/or to ensure that the interconnected transaction are correctly completed between the financial subsystems 112.

Interconnected transaction ledger 120 may comprise one or more hardware and/or software components, and may comprise one or more databases capable of storing and maintaining data. For example, interconnected transaction ledger 120 may comprise one or more databases configured to store and maintain data regarding interconnected transactions, as discussed further herein.

In various embodiments, interconnected transaction ledger 120 may be based on one or more digital ledger technologies ("DLT"), as described herein, and may be configured to simplify and automate the interconnected transaction processes by using the DLTs as a distributed and tamper-proof data store. For example, interconnected transaction ledger 120 may implement a DLT technology such as blockchain, tangle, or the like.

In various embodiments, interconnected transaction ledger 120 may comprise a blockchain network configured to maintain a blockchain. Interconnected transaction ledger 120 may be a peer-to-peer network that is private, federated, and/or public in nature (e.g., the ETHEREUM® system, the Bitcoin system, the HYPERLEDGER® Fabric system, etc.). Federated and private networks may offer improved control over the content of the blockchain and public networks may leverage the cumulative computing power of the network to improve security. Interconnected transaction ledger 120 may comprise various blockchain nodes (e.g., consensus participants) in electronic communication with each other, as discussed further herein. Each blockchain node may comprise a computing device configured to write blocks to the blockchain and validate blocks of the blockchain. The computing devices may take the form of a computer or processor, or a set of computers and/or processors or application specific integrated circuits (ASICs), although other types of computing units or systems may also be used. Exemplary computing devices include servers, pooled servers, laptops, notebooks, hand held computers, personal digital assistants, cellular phones, smart phones (e.g., an IPHONE® device, a BLACKBERRY® device, an ANDROID® device, etc.), tablets, wearables (e.g., smart watches and smart glasses), Internet of Things (IOT) devices, or any other device capable of receiving data over network. Each computing device may run applications to interact with interconnected transaction ledger 120, communicate with other devices, perform crypto operations, and otherwise operate within system 100. Computing devices may run a client application that can be a thin client (web), hybrid (i.e. web and native, such as iOS and ANDROID® systems), or native application to make API calls to interact with the blockchain, such as a web3 API compatible with blockchain databases maintained by the ETHEREUM® system.

The blockchain may be based on any blockchain technology such as, for example, ETHEREUM®, OPENCHAIN®, Chain Open Standard technology, HYPERLEDGER® Fabric, CORDA®, Connect™, Sawtooth™, etc. The blockchain may comprise a system of blocks containing data that are interconnected by reference to the previous block. Each block may link to the previous block and may include a timestamp. Data can be added to the blockchain by establishing consensus between the blockchain nodes based on proof of work, proof of stake, practical byzantine fault tolerance, delegated proof of stake, or other suitable consensus algorithms. When implemented in support of system 100, the blockchain may serve as an immutable log for interconnected transactions and related contracts and processes.

A blockchain address may be uniquely assigned to each blockchain node or participant to function as a unique identifier for each participant in interconnected transaction ledger 120. For example, each participant may register with interconnected transaction ledger 120, and/or an existing trust participant (e.g., identity provider), and may be assigned and provided a private key and public key pair. In various embodiments, interconnected transaction ledger 120 may use a Hierarchical Deterministic (HD) solution to enable the creation of one or more child keys from one or more parents keys in a hierarchy. Each child key may be assigned to a participant in interconnected transaction ledger 120. For example, interconnected transaction ledger 120 may use BIP32 BIP39, and/or BIP44 to generate an HD tree of public addresses.

In various embodiments, interconnected transaction ledger 120 may host and/or implement one or more smart contracts. The smart contracts may control the end-to-end data flow in system 100 and may autonomously govern the maintenance process by supporting execution and recording of various interconnected transaction data, as discussed further herein. The smart contracts may comprise executables that write data to the blockchain in a predetermined format based on predetermined function parameters passed by an API call or the like. Each smart contract may include a program written in a programming language such as, for example, Solidity, or any other suitable smart contract programming language.

In various embodiments, data transfers performed through the blockchain-based interconnected transaction ledger 120 may propagate to the connected peers within interconnected transaction ledger 120 within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system and processes described herein, the security of the data is improved, which decreases the risk of the computer or network from being compromised.

In various embodiments, use of the blockchain-based interconnected transaction ledger 120 may also reduce database synchronization errors by providing a common data structure, thus at least partially improving the integrity of stored data. The blockchain-based interconnected transaction ledger 120 may also offer increased reliability and fault tolerance over traditional databases (e.g., relational databases, distributed databases, etc.) as each node operates with a full copy of the stored data, thus at least partially reducing downtime due to localized network outages and hardware failures. The blockchain-based interconnected transaction ledger 120 may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

In various embodiments, financial system 110, via one or more financial subsystems 112, may be configured to write data to interconnected transaction ledger 120 during the identity-based interconnected transaction process. For example, in response to a user initiating an interconnected transaction from a first financial subsystem to a second financial subsystem, each involved financial subsystem may be configured to write interconnected transaction data to interconnected transaction ledger 120, such as in response to transmitting the interconnected transaction or receiving the interconnected transaction.

In various embodiments, in a DLT-based interconnected transaction ledger 120, one or more financial subsystems 112 may comprise a blockchain node. The blockchain node may be configured to maintain a copy of the blockchain maintained by interconnected transaction ledger 120, write and/or retrieve data and blocks from the blockchain, validate blocks of the blockchain, and/or propagate writes to the blockchain to interconnected transaction ledger 120. Each blockchain node may communicate with one or more blockchain to validate and write blocks to the blockchain, and to establish consensus between the blockchain nodes based on proof of work, proof of stake, practical byzantine fault tolerance, delegated proof of stake, or other suitable consensus algorithms. The blockchain node may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. The blockchain node may run applications to interact with the blockchain, communicate with other devices, perform crypto operations, and otherwise operate within system 100.

In various embodiments, one or more financial subsystems 112 may also be configured to write and retrieve data from interconnected transaction ledger 120 without the use of a blockchain node. For example, and with reference again to FIG. 2, one or more financial subsystems 112 may communicate with interconnected transaction ledger 120 via a ledger communicator 225. Ledger communicator 225 may comprise one or more hardware, software, and/or database components. Ledger communicator 225 may be configured to provide software, services, and interfaces to enable communications between one or more financial subsystems 112 and interconnected transaction ledger 120. For example, ledger communicator 225 may comprise one or more of an application programming interface (API), a software development kit (SDK), a web service, and/or the like. Ledger communicator 225 may comprise programmatic libraries configured to translate and transmit queries and commands from one or more financial subsystems 112 and interconnected transaction ledger 120. For example, and in accordance with various embodiments, ledger communicator 225 may be configured to translate requests received by one or more financial subsystems 112 into a blockchain format using a blockchain SDK library, or the like, which may include digital signing using system or subsystem-specific security certificates. In that respect, one or more financial subsystems 112 may comprise one or more system or subsystem-specific cryptographic keys used to perform cryptographic operations. As a further example, and in accordance with various embodiments, ledger communicator 225 may be configured to translate data retrieved from interconnected transaction ledger 120 into a format readable by the one or more financial subsystems 112, which may include digital signature verification and/or data transformation from a blockchain specific data layout to an application specific data layout.

As a further example, and in accordance with various embodiments, ledger communicator 225 may include a blockchain oracle configured to generate one or more notifications in response to data being written to interconnected transaction ledger 120. The blockchain oracle may be configured to query interconnected transaction ledger 120, or a blockchain node of interconnected transaction ledger 120, at a defined interval to search for new writes to interconnected transaction ledger 120. The blockchain oracle may be controlled by notification triggers containing filters indicating the types of data written to interconnected transaction ledger 120 that will generate a notification. For example, in response to the blockchain oracle determining that data has been written to interconnected transaction ledger 120 that includes an identification corresponding to a first financial subsystem (e.g., an interconnected transaction includes the first financial subsystem), the blockchain oracle may generate a notification and transmit the notification to the corresponding first financial subsystem.

In various embodiments, knowledge system 130 may be in electronic communication with financial system 110, interconnected transaction ledger 120, third party data provider 140, and/or identity orchestration engine 150. Knowledge system 130 may comprise one or more hardware, software, and/or database components. For example, knowledge system 130 may comprise one or more network environments, servers, computer-based systems, processors, databases, and/or the like. Knowledge system 130 may comprise at least one computing device in the form of a computer or processor, or a set of computers/processors, although other types of computing units or systems may be used such as, for example, a server, web server, pooled servers, or the like. Knowledge system 130 may also include software, such as services, APIs, and the like, configured to perform various operations discussed herein. In various embodiments, knowledge system 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, knowledge system 130 may be configured to generate one or more identity-based recommendations. For example, and as discussed further herein, knowledge system 130 may generate the identity-based recommendation based on a user's interactions with financial system 110 (e.g., interconnected transactions transmitted and completed), third party data received from third party data provider 140, and/or any other suitable data points. The identity-based recommendation may comprise data recommending that the user interact with financial system 110 (or other system 100 component) in a specified way. For example, in response to a user using reward points from his consumer transaction account to pay off part of his merchant payable account for three straight months, on a fourth month the identity-based recommendation may prompt the user to again use the reward points to pay off part of the merchant payable account.

In various embodiments, knowledge system 130 may implement various artificial intelligence, machine learning, and/or statistical analysis techniques to aid in various calculations and operations discuss herein. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. For example, and in accordance with various embodiments, knowledge system 130 may implement machine learning algorithms and models to aid in generating the identity-based recommendations.

Knowledge system 130 may implement any suitable machine learning model or algorithm, statistical data model, or the like, and may be supervised or unsupervised. For example, exemplary unsupervised models may include clustering and dimensionality reduction, LDA topic modeling, and/or any other unsupervised machine learning model. For example, exemplary supervised models may include classification models, regression models, sentiment analysis techniques, and/or any other supervised machine learning model. The machine learning model may be trained to aid in generating the identity-based recommendation. For example, the machine learning model may receive as input data from interconnected transactions, third party data, and/or the like, and may generate the identity-based recommendation based on the inputs. In various embodiments, machine learning networks and/or subject matter experts may initially supervise the model. In various embodiments, the machine learning model may comprise random forest models, gradient boosting models, or any other suitable or desired model. In various embodiments, knowledge system 130 may also implement reinforcement learning techniques to enhance the machine learning algorithm and/or statistical data models.

In various embodiments, knowledge system 130 may also be configured to perform balancing and control operations on interconnected transaction ledger 120. For example, data transfer policies typically include an audit of passed data transfers to determine that the data transfers were accurate. Balancing and Control (B&C) may refer to the process to ensure data transfer between systems is accurate, complete, and on-time. Knowledge system 130 may perform the balancing and control operations using any suitable technique or technical process.

In various embodiments, third party data provider 140 may be in electronic communication with financial system 110, knowledge system 130, and/or identity orchestration engine 150. Third party data provider 140 may comprise various hardware, software, and/or database components, and may be configured to provide third party data to financial system 110 and/or knowledge system 130. For example, third party data provider 140 may comprise one or more servers, computer-based systems, network environments, or the like. Third party data provider 140 may comprise any suitable source of third party data, such as, for example, credit reporting agencies, postal services (e.g., United States Postal Services, United Postal Services, etc.), social media platforms, and/or the like. The third party data may comprise any suitable or desired data associated with users registered with financial system 110, such as, for example, credit information, address change information, FICO® requests, compliance and regulatory data, public records, and/or the like. In various embodiments, the third party data may comprise financial risk data (e.g., provided by FICO®, TRANSUNION®, EQUIFAX®, CREDIT KARMA®, etc.), user financial information (e.g., debt to income ratio, etc.), and/or the like.

Figure 4:
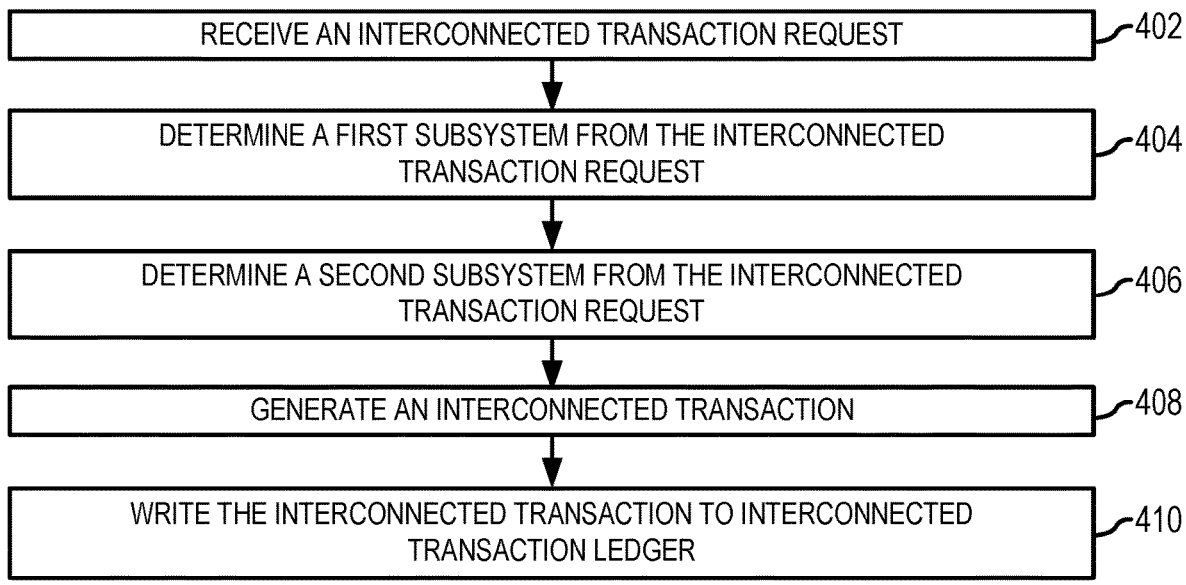
FIG. 4 illustrates a process flow for a method of processing an interconnected transaction, in accordance with various embodiments.
Figure 5:
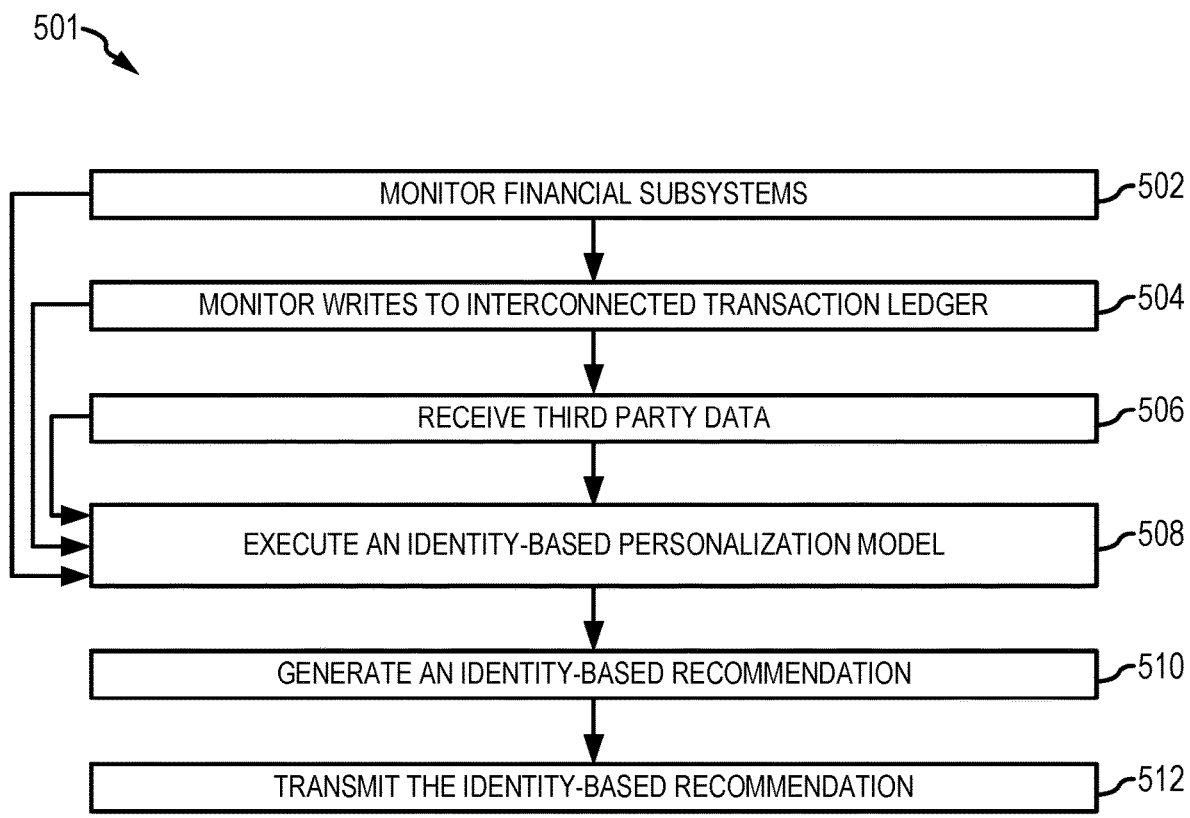
FIG. 5 illustrates a process flow for a method of generating an identity-based recommendation, in accordance with various embodiments.

Referring now to FIGS. 4 and 5 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 4 and 5, but also to the various system components as described above with reference to FIGS. 1-3D. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 4, a method 401 for processing an interconnected transaction is disclosed. Method 401 may comprise receiving an interconnected transaction request (step 402). Financial system 110, either directly or via a first financial subsystem, may be configured to receive the interconnected transaction request.

A user, via user device 105 and UI 115, may access identity orchestration engine 150 to interact with financial system 110. For example, the user may input user credentials (e.g., username, password, biometric input, etc.) to access financial system 110, via identity orchestration engine 150. Financial system 110 may receive the user credentials and authorize the user based on any suitable authorization process. In various embodiments, the user credentials may be associated with various security and/or access provisions, subsystem registrations, account data, and/or the like (e.g., subscriber data). In that respect, in response to authorizing the user, financial system 110 may grant the user access to subsystems and account that the user is registered for and/or associated with.

In response to receiving authorization, the user may interact with UI 115 and identity orchestration engine 150, via user device 105, to generate and transmit the interconnected transaction request. The interconnected transaction request may comprise a first financial subsystem data, a second financial subsystem data, and a transaction request. The first financial subsystem data may comprise data regarding the first subsystem that the user desires to interact with. For example, the first financial subsystem data may comprise a first subsystem identifier, a first subsystem system or database, and/or the like. For example, wherein the first subsystem comprises a consumer transaction account system, the first subsystem system or database may comprise a rewards points system or database from the consumer transaction account system. The second financial subsystem data may comprise data regarding the second subsystem that the user desires to interact with. For example, the second financial subsystem data may comprise a second subsystem identifier, a second subsystem system or database, and/or the like. For example, wherein the second subsystem comprises a merchant system, the second subsystem system or database may comprise an accounts payable system from the merchant system. In various embodiments, the first financial subsystem and the second financial subsystem may not be in direct communication with each other.

The transaction request may comprise data regarding the details of the transaction the user desires between the first subsystem and the second subsystem. For example, the transaction request may comprise a transfer, a command, a transaction amount, or the like. For example, wherein the first subsystem comprises a consumer transaction account system and the second subsystem comprises a merchant system, the transaction request may comprise data regarding the desired transaction between the two systems, such as, for example, using consumer-based reward points to pay an outstanding merchant payable account balance.

In various embodiments, the transaction request may comprise a first transaction request (e.g., a first system transaction request) and a second transaction request (e.g., a second system transaction request). The first financial subsystem may be configured to complete the first transaction request, and the second financial subsystem may be configured to complete the second transaction request. For example, in response to the interconnected transaction comprising using consumer-based reward points to pay an outstanding merchant payable account balance, the first transaction request may comprise data instructing the consumer transaction account system to deduct a specified amount from the user's reward points, and the second transaction request may comprise data instructing the merchant system to credit the deducted user reward points amount to the merchant's payable account.

In various embodiments, the transaction request may also comprise second user data. The second user data may comprise a second user identifier (e.g., name, address, account identifier, etc.) associated with the second user. In that regard, the user (e.g., the first user) may desire to complete a transfer and/or transaction with the second user across different financial subsystems. For example, the user may desire to transfer funds from his merchant accounts receivable to the second user's consumer transaction account, and/or the like. In that regard, and in accordance with various embodiments, the interconnected transaction request may be transmitted by a first user. The first system transaction request may be associated with a first account of the first user. The second system transaction request may compromise data defining a second account associated with a second user.

Method 401 may comprise determining a first subsystem from the interconnected transaction request (step 404). Financial system 110 may parse the interconnected transaction request to determine the first financial subsystem data. In various embodiments, the first financial subsystem may also be configured to receive the interconnected transaction request. Method 401 may comprise determining a second subsystem from the interconnected transaction request (step 406). Financial system 110 may parse the interconnected transaction request to determine the second financial subsystem data. In various embodiments, financial system 110 may also parse the interconnected transaction request to determine the transaction request.

Method 401 may comprise generating an interconnected transaction (step 408). The first financial subsystem of financial system 110 may be configured to generate the interconnected transaction. The interconnected transaction may comprise the second financial subsystem data and the transaction request. The interconnected transaction may also comprise the first financial subsystem identifier.

Method 401 may comprise writing the interconnected transaction to interconnected transaction ledger 120 (step 410). The first financial subsystem of financial system 110 may be configured to write the interconnected transaction to interconnected transaction ledger 120. The first financial subsystem may write the interconnected transaction data using any suitable technique or process. In various embodiments, in response to interconnected transaction ledger 120 being DLT-based, the first financial subsystem may write the interconnected transaction to interconnected transaction ledger 120 using a blockchain node, ledger communicator 225, and/or the like. For example, the first financial subsystem (via the blockchain node, ledger communicator 225, etc.) may write the interconnected transaction to a local copy of the blockchain and may propagate the write to consensus participants of the network. The consensus participants may achieve consensus and add the interconnected transaction write to interconnected transaction ledger 120. The consensus participants may achieve consensus using proof of work, proof of stake, practical byzantine fault tolerance, delegated proof of stake, or other suitable consensus algorithm. The consensus participants may write the interconnected transaction to interconnected transaction ledger 120 using any suitable technique. In response to achieving consensus and completing the write, the consensus participants may transmit a write confirmation to the first financial subsystem. The write confirmation may comprise data indicating that the interconnected transaction was successfully written to interconnected transaction ledger 120. In various embodiments, the write confirmation may also comprise data pointing to the location of the write on interconnected transaction ledger 120, such as a uniform resource locator (URL), or the like.

In various embodiments, the second financial subsystem of financial system 110 may be configured to retrieve the interconnected transaction from interconnected transaction ledger 120. The second financial subsystem may retrieve the interconnected transaction using any suitable process or technique. For example, wherein interconnected transaction ledger 120 is DLT-based, the second financial subsystem may retrieve the interconnected transaction from interconnected transaction ledger 120 using a blockchain node, ledger communicator 225, and/or the like. The second financial subsystem may parse the interconnected transaction, and may complete the interconnected transaction based on the transfer request.

In various embodiments, in response to completing the interconnected transaction, the second financial subsystem may also be configured to write an interconnected transaction response to interconnected transaction ledger 120. The interconnected transaction response may comprise data indicating that the interconnected transaction was successfully completed. The interconnected transaction response may be written to interconnected transaction ledger 120 using any suitable technique.

With specific reference to FIG. 5, a method 501 for generating an identity-based recommendation is disclosed. Method 501 may comprise monitoring financial subsystems (step 502) and monitoring writes to interconnected transaction ledger 120 (step 504). Knowledge system 130 may be configured to monitor financial subsystems writes to and retrievals from interconnected transaction ledger 120. For example, knowledge system 130 may monitor a first financial subsystem writing an interconnected transaction to interconnected transaction ledger 120. Knowledge system 130 may monitor a second financial subsystem retrieving the interconnected transaction from interconnected transaction ledger 120. Knowledge system 130 may monitor the writes and retrievals to determine the financial subsystems that the user is interacting with, the frequency of interactions, the types of interactions, and/or the like.

Method 501 may comprise receiving third party data (step 506). Knowledge system 130 may be configured to receive the third party data from third party data provider 140. The third party data may comprise credit information, address change information, compliance and regulatory data, public records, financial risk data (e.g., provided by FICO®, TRANSUNION®, EQUIFAX®, CREDIT KARMA®, etc.), user financial information (e.g., debt to income ratio, etc.), and/or the like.

Method 501 may comprise executing an identity-based personalization model (step 508). Knowledge system 130 may execute the identity-based personalization model based on the data gathered from monitoring the financial system and the writes to interconnected transaction ledger 120, the third party data, and/or any other suitable data points. The identity-based personalization model may comprise any suitable machine learning model configured to analyze the monitoring data, the third party data, and the like, and provide recommendations and historical analysis of the data.

Method 501 may comprise generating an identity-based recommendation (step 510). Knowledge system 130 may be configured to generate the identity-based recommendation based on the executed identity-based personalization model. The identity-based recommendation may comprise a user recommendation or a financial system recommendation. For example, the user recommendation may comprise data recommending an interaction to the user, based on the history of the user's interactions in the system. For example, in response to a user using reward points from his consumer transaction account to pay off part of his merchant payable account for three straight months, on a fourth month the user recommendation may comprise data prompting the user to again use the reward points to pay off part of the merchant payable account.

As a further example, the financial system recommendation may comprise data recommending an action for financial system 110. For example, in response to the third party data and/or monitoring data indicating that the user recently missed a payment on a consumer transaction account, foreclosed a house, or the like, the financial system recommendation may comprise data indicating that financial system 110 should consider suspending the user's accounts across financial subsystems, or the like.

Method 501 may comprise transmitting the identity-based recommendation (step 512). Knowledge system 130 may be configured to transmit the identity-based recommendation. In various embodiments, knowledge system 130 may transmit the identity-based recommendation to identity orchestration engine 150, UI 115, and/or user device 105. Knowledge system 130 may transmit the identity-based recommendation to identity orchestration engine 150, UI 115, and/or user device 105 in response to the identity-based recommendation comprising a user recommendation. For example, identity orchestration engine 150 may display the identity-based recommendation to a user, via UI 115 and user device 105. As a further example, knowledge system 130 may transmit the identity-based recommendation to user device 105 via email, SMS, MMS, push notification, and/or the like.

In various embodiments, knowledge system 130 may transmit the identity-based recommendation to financial system 110. For example, in response to the identity-based recommendation comprising a financial system recommendation, knowledge system 130 may transmit the identity-based recommendation to financial system 110. Financial system 110 may be configured to process and act on the identity-based recommendation using any suitable process, and based on any rules or configurations.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100, or one or more subcomponents of system 100, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g. WEB-SPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 ® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in system 100, including in one or more databases, may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a first computing device, an interconnected transaction request generated by a knowledge system for a user based in part on data from an interconnected transaction ledger, where the interconnected transaction request comprises a first subsystem identifier representing a first subsystem, a second subsystem identifier representing a second subsystem, and a transaction request representing a transaction between the first subsystem and the second subsystem;
identifying, by the first computing device, the first subsystem from the first subsystem identifier of the interconnected transaction request;
identifying, by the first computing device, the second subsystem from the second subsystem identifier of the interconnected transaction request;
generating, by the first computing device, an interconnected transaction comprising the first subsystem identifier, the second subsystem identifier, and the transaction request; and
writing, by the first computing device, the interconnected transaction to the interconnected transaction ledger, wherein the interconnected transaction can be retrieved by the second subsystem to complete the transaction between the first subsystem and the second subsystem.

2. The method of claim 1, further comprising
detecting, by a second computing device, that the interconnected transaction has been written to the interconnected transaction ledger; and
executing, by the second computing device in response to detecting that the interconnected transaction has been written to the interconnected transaction ledger, an identity-based personalization model that generates a recommended action for a user associated with the interconnected transaction, wherein the identity-based personalization model uses third-party data and the interconnected transaction to generate the recommended action.

3. The method of claim 2, further comprising transmitting, by the second computing device, the recommended action to an orchestration service, user interface, or user device.

4. The method of claim 2, further comprising receiving the third-party data.

5. The method of claim 2, wherein the third-party data comprises credit information, address change information, compliance data, regulatory data, public records, risk data, or user information.

6. The method of claim 1, further comprising completing, by the first subsystem, a first system transaction request in response to the receiving the interconnected transaction request, wherein the transaction request comprises the first system transaction request and a second system transaction request.

7. The method of claim 6, further comprising completing, by the second subsystem, the second system transaction request from the transaction request.

8. The method of claim 6, wherein the interconnected transaction request is transmitted by a first user, wherein the first system transaction request is associated with a first account of the first user, and wherein the second system transaction request defines a second account associated with a second user.

9. The method of claim 1, further comprising writing the interconnected transaction request to the interconnected transaction ledger via a blockchain node.

10. A system comprising:
a first computing device comprising a first processor, a first memory, and a first set of instructions stored in the first memory that, when executed by the first processor, cause the first computing device to at least:
receive an interconnected transaction request generated by a knowledge system for a user based in part on data from an interconnected transaction ledger, where the interconnected transaction request comprises a first subsystem identifier representing a first subsystem, a second subsystem identifier representing a second subsystem, and a transaction request representing a transaction between the first subsystem and the second subsystem;
identify the first subsystem from the first subsystem identifier of the interconnected transaction request;
identify the second subsystem from the second subsystem identifier of the interconnected transaction request;
generate an interconnected transaction comprising the first subsystem identifier, the second subsystem identifier, and the transaction request; and
write the interconnected transaction to the interconnected transaction ledger, wherein the interconnected transaction can be retrieved by the second subsystem to complete the transaction between the first subsystem and the second subsystem.

11. The system of claim 10, further comprising a second computing device comprising a second processor, a second memory, and a second set of instructions stored in the second memory that, when executed by the second processor, cause the second computing device to at least:
detect that the interconnected transaction has been written to the interconnected transaction ledger; and
in response to detecting that the interconnected transaction has been written to the interconnected transaction ledger, execute an identity-based personalization model that generates a recommended action for a user associated with the interconnected transaction, wherein the identity-based personalization model uses third-party data and the interconnected transaction to generate the recommended action.

12. The system of claim 11, wherein the second set of instructions further cause the computing device to perform operations comprising transmitting the recommended action to an orchestration service, user interface, or user device.

13. The system of claim 11, wherein the second set of instructions further cause the computing device to receive the third-party data.

14. The system of claim 11, wherein the third-party data comprises credit information, address change information, compliance data, regulatory data, public records, risk data, or user information.

15. The system of claim 10, wherein the first subsystem is configured to complete a first system transaction request in response to receipt of the interconnected transaction request, wherein the transaction request comprises the first system transaction request and a second system transaction request.

16. The system of claim 15, wherein the second subsystem is configured to complete the second system transaction request.

17. The system of claim 15, wherein the interconnected transaction request is transmitted by a first user, wherein the first system transaction request is associated with a first account of the first user, and wherein the second system transaction request defines a second account associated with a second user.

18. The system of claim 10, wherein the interconnected transaction ledger comprises a blockchain.

19. The system of claim 10, wherein the first set of machine-readable instructions cause the first computing device to write the interconnected transaction request to the interconnected transaction ledger using a blockchain node.

20. A non-transitory computer-readable medium comprising machine readable instructions that, when executed by a processor of a computing device, cause the computing device to at least:

receive an interconnected transaction request generated by a knowledge system for a user based in part on data from an interconnected transaction ledger, where the interconnected transaction request comprises a first subsystem identifier representing a first subsystem, a second subsystem identifier representing a second subsystem, and a transaction request representing a transaction between the first subsystem and the second subsystem;

identify the first subsystem from the first subsystem identifier of the interconnected transaction request;

identify the second subsystem from the second subsystem identifier of the interconnected transaction request;

generate an interconnected transaction comprising the first subsystem identifier, the second subsystem identifier, and the transaction request; and write the interconnected transaction to the interconnected transaction ledger, wherein the interconnected transaction can be retrieved by the second subsystem to complete the transaction between the first subsystem and the second subsystem.

\* \* \* \* \*